United States Patent [19]

Daray, Jr. et al.

[11] Patent Number: 5,951,658
[45] Date of Patent: Sep. 14, 1999

[54] SYSTEM FOR DYNAMIC ALLOCATION OF I/O BUFFERS FOR VSAM ACCESS METHOD BASED UPON INTENDED RECORD ACCESS WHERE PERFORMANCE INFORMATION REGARDING ACCESS IS STORED IN MEMORY

[75] Inventors: Edward Henry Daray, Jr., Saratoga; Tina Lynn Dunton, San Jose, both of Calif.

[73] Assignee: International Business Machines Corporation, Armonk, N.Y.

[21] Appl. No.: 08/937,497

[22] Filed: Sep. 25, 1997

[51] Int. Cl.[6] .................................................. G06F 12/08
[52] U.S. Cl. .............................................. 710/56; 710/52
[58] Field of Search ................................. 395/653, 876; 711/160, 172; 364/231; 710/56

[56] References Cited

U.S. PATENT DOCUMENTS

| | | | |
|---|---|---|---|
| 4,468,729 | 8/1984 | Schwartz | 711/172 |
| 4,928,237 | 5/1990 | Bealkowski et al. | 395/653 |
| 5,179,662 | 1/1993 | Corrigan et al. | 395/250 |
| 5,325,525 | 6/1994 | Shan et al. | 395/650 |
| 5,452,418 | 9/1995 | Tatosian et al. | 711/160 |
| 5,491,810 | 2/1996 | Allen | 395/444 |
| 5,524,214 | 6/1996 | Kurihara | 395/250 |
| 5,530,902 | 6/1996 | McRoberts et al. | 395/848 |
| 5,615,392 | 3/1997 | Harrison et al. | 395/876 |
| 5,799,210 | 8/1998 | Cohen et al. | 395/876 |

*Primary Examiner*—Thomas C. Lee
*Assistant Examiner*—Chien Yuan
*Attorney, Agent, or Firm*—Noreen A. Krall

[57] ABSTRACT

The present invention provides system managed buffering within a data storage system. In a preferred embodiment, when a user or application program makes an I/O request, the data storage system passes control to system managed buffering. System managed buffering queries the user or application request to see how the user/application will be reading or writing the data. Based on the intended use, the system and method disclosed herein allocates the buffers for the user or application based on the intended access to the data, the file size and optionally, the storage device attributes. Also in accordance with the objects of the present invention, the system and method provide for continuous improvement over the previous buffer allocations.

34 Claims, 13 Drawing Sheets

SYSTEM FOR DYNAMIC ALLOCATION OF I/O BUFFERS FOR VSAM ACCESS METHOD BASED UPON INTENDED RECORD ACCESS WHERE PERFORMANCE INFORMATION REGARDING ACCESS IS STORED IN MEMORY

BACKGROUND OF THE INVENTION

1. Field of the Invention

The present invention relates in general to computer controlled data storage systems, and in particular to the automatic management of I/O buffers within a data storage subsystem. Still more particularly, the present invention relates to a system and method of automatically allocating and managing I/O buffers for a data processing system that keys off the intended record access of the data by the end user or application specified processing intent.

2. Description of the Related Art

Direct access storage devices are devices that allow direct retrieval of a record by supplying an access method an I/O request with an address or a key that can be translated into an exact location on a disk in the storage device. The term access method is used to describe the software designed to access records stored on the peripheral device such as the disk. One popular and widely used access method for direct access storage devices is the virtual storage access method or VSAM. VSAM's popularity has been based on its capabilities for insertion of records, recovery, restart and overall performance. VSAM files have been around for several decades and are widely found within data centers.

Data centers, applications and computer users all desire optimum performance from their data storage systems. Where before it might have been acceptable to wait long periods of time for data operations between the user or application and the data storage system to complete, users today do not tolerate noticeably poor performance. The goal of the data storage system designer is to make the system appear as quick and responsive as possible.

The single most important factor influencing VSAM performance is I/O buffering. Most data storage systems today use buffers to page data into and out of auxiliary storage. The buffers are located in a faster memory area such as main storage. Using the virtual storage access method to read data to and write data from auxiliary storage, the user or application program has heretofore had to manually manage the allocation and size of the I/O buffers. To this end, the user has to know the size and control intervals of the VSAM file, the number of data buffers to be allocated, the number of index buffers to be allocated, the amount of storage area available for all buffers and the type of access (random or sequential) to take place. As can readily be imagined, this approach is problematic as it is cumbersome, imprecise and inefficient. For example, the application may suffer poor performance if the I/O buffers are under allocated, while the system may be burdened with excessive I/Os if the buffers are over allocated. The user or application developer thus far has been burdened with a need to understand the details of the underlying access method to the data and have to make decisions of sizing and techniques for buffering to provide the most efficient access.

There have been some attempts in the prior art to automate the allocation and management of I/O buffers within a data storage system. For example, U.S. Pat. No. 5,524,214 issued to Kurihara describes a dynamic buffer change system for an information processing system where a user can request to change a setting for the buffer areas of a class of data. A change controller compares the current setting with the requested setting. If a discrepancy is found, the buffer area setting means changes the setting of the buffer area according to the requested setting during operation of the information handling system. The setting for the buffer areas includes the size and number of areas.

U.S. Pat. No. 5,491,810 describes an automated data storage space allocation system that compares a list of data set parameters with a listing of characteristics associated with each data storage device whenever a processor attempts to store that particular data set. If the entire list of data set parameters is matched, the data set is stored in the first data storage device. If the entire list is not matched the system selects a data storage device that optimally satisfies the data set parameter list.

Although the aforementioned approaches have made some progress in the automation of I/O buffer management, there are still some requirements of user intervention, by either the definition of the buffer parameters or data set parameters. It can be seen that there is a need for an automated buffer management system that automatically allocates the size and number of buffers for a specified application processing intent. It can further be seen that the automated buffer management system should be dynamic enough to optimize the buffer management technique based on the intended record access to the data. It can also be seen that there is a need for an automated buffer management system that keeps a historical record of data access by application and which can improve on the buffer allocation method by analysis of past inefficiencies.

SUMMARY OF THE INVENTION

To overcome the shortcomings of the prior art, it is the object of the present invention to provide a system and method for the automatic allocation of buffers for a specified application processing intent. It is the further object of the invention to provide a system and method that allocates buffers based on the intended access to the data by the user or the application. It is the further object of the invention to optimize the performance of the data storage system by allocating buffers based on a variety of factors that will minimize the instances of over-allocation and under-allocation of buffers. It is still a further object of the invention to provide a buffer allocation system and method that is continually improving, so that past inefficiencies are corrected in the buffer allocations of future application processing.

In accordance with these objects the present invention provides system managed buffering within a data storage system. In a preferred embodiment, when a user or application program opens a dataset, the data storage system passes control to system managed buffering. System managed buffering queries the user or application processing intent to see how the user/application will be reading or writing the data. For example, the request may be from a banking transaction processor to read specific records within a file (random access), or alternatively the request may be from a payroll application to write blocks of data to a file at one time (sequential access). Based on the intended use, the system and method disclosed herein allocates the buffers for the user or application based on the intended access to the data, the file size and optionally, the storage device attributes. Also in accordance with the objects of the present invention, the system and method provide for continuous improvement over the buffer allocation methods.

In accordance with the preferred embodiment of the present invention, the system provides means to determine the optimal number of I/O buffers needed for a particular application based on anticipated patterns of record access retrieval. The primary buffering options in the system of the present invention include a direct optimized method, a direct weighted method, a sequential optimized method, a sequential weighted method, a create optimized method, and a create recovery method. Briefly, the direct optimized method is used when the record access is in random order. The direct weighted method is used for buffer allocation and management when the record access will be mostly by direct processing, although there will be some sequential processing of the data records. A sequential optimized method is used when the record access is strictly in sequential order. The sequential weighted method of buffer allocation and management is used when the record access will be a majority of sequential processing, although there will be some direct processing. The create recovery and create optimized methods of buffer allocation and management are used when a data set is first opened and written to, and the methods key off what kind of recovery the user wants if the system fails during the create processing.

The system and method of the present invention further includes an analysis and reporting option that allows for continual improvements for the buffer allocation system. To this end, each time the system manages the buffering for an I/O request, it creates a database record on the request and performance of that instance of the I/O to data. Then, for future data open requests, the system can simply query the file and determine if the previous method could be improved on. For example, an application program may have issued a data open request and passed the parameters that record access would be in sequential order. Initially, the system would have selected a sequential optimized method calculating the size and number of I/O buffers. The historical record will show, however, if the application really accessed the data in a majority of direct processing, with only some sequential processing. For later data open requests by the same application, the system may now select the direct weighted method of buffer allocation. The system can make an improved decision on which method to use for buffer allocation based on the historical data.

These and various other advantages and features of novelty which characterize the present invention are pointed out with particularity in the claims annexed hereto and form a part hereof. However, for a better understanding of the invention, its advantages, and the objects obtained by its use, reference should be made to the drawings which form a part hereof, and to the accompanying descriptive matter, in which there is illustrated and described specific examples of a system and method in accordance with the present invention.

DETAILED DESCRIPTION OF THE PREFERRED EMBODIMENTS

The present invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

The invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture according to the invention. The article of manufacture containing the computer program's code is used by either executing the code directly from the storage device, by copying the code from the storage device into another storage device such as hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems containing or having network access to computer programming code according to the invention.

Figure 1:
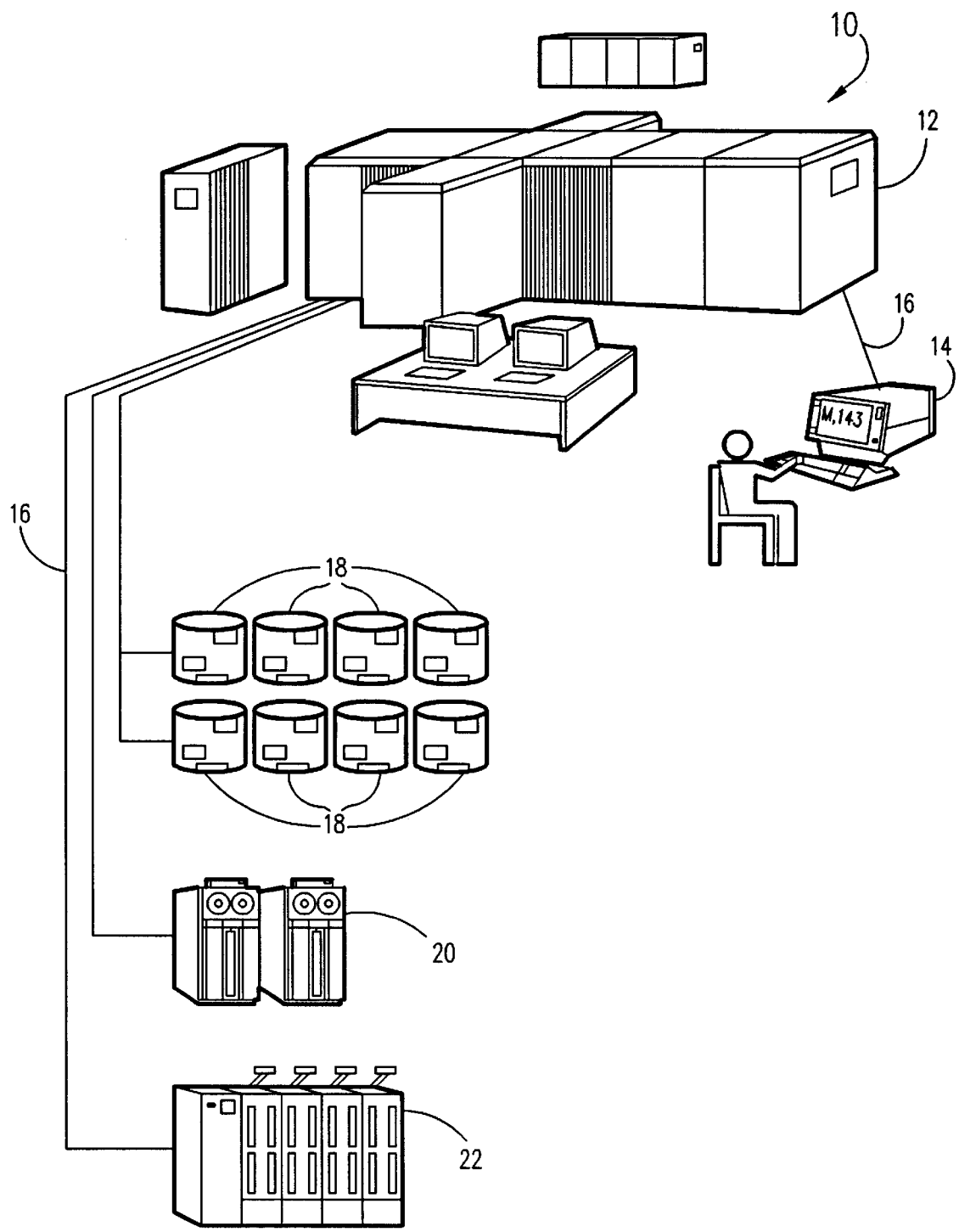
FIG. 1 is a schematic block diagram illustrating a distributed data processing system that could include the method of buffer management as described in the present invention.

Referring to FIG. 1, there is depicted a pictorial representation of a distributed data processing system 10 which may be utilized to implement the method and system of the present invention. The distributed data processing system 10 may include a plurality of networks, such as local area networks, (LAN) (not shown) as well as users 14 connected by suitable connection means 16 to one or more mainframe computers 12 having a host processor. The mainframe computer 12 is connected to external storage such as DASD 18 and tape 20, 22. The mainframe computer 12 preferably comprises at least one processor to execute the system and application code, memory to hold the system code, application code and data, and means responsive to read and write calls from executing applications for accessing information through the system code (otherwise termed operating systems, such as IBM MVS and IBM AIX operating system) not otherwise in memory from the external storage.

One example of the host system is the IBM S/390 running the MVS operating system. In U.S. Pat. No. 4,207,609, Method and Means for Path Independent Device Reservation and Reconnection in a Multi-CPU and Shared Device Access System issued Jun. 10, 1980, Luiz et al. describe an architecture for establishing an access path to data in which a host obtains variable or fixed length records from an attached disk storage subsystem. The host central processing unit (CPU) creates a dedicated virtual processor for accessing and transferring data over demand/response interfaces to attached subsystems using chains of special purpose I/O instructions called channel command words (CCWs). When an application program executes a read or a write command requiring access to external storage, such as disk storage, then the MVS system initiates such a reference with a start I/O command. Sufficient buffers need to be allocated in main memory, so that the I/O command can complete while the application program is free to continue executing.

Figure 2:
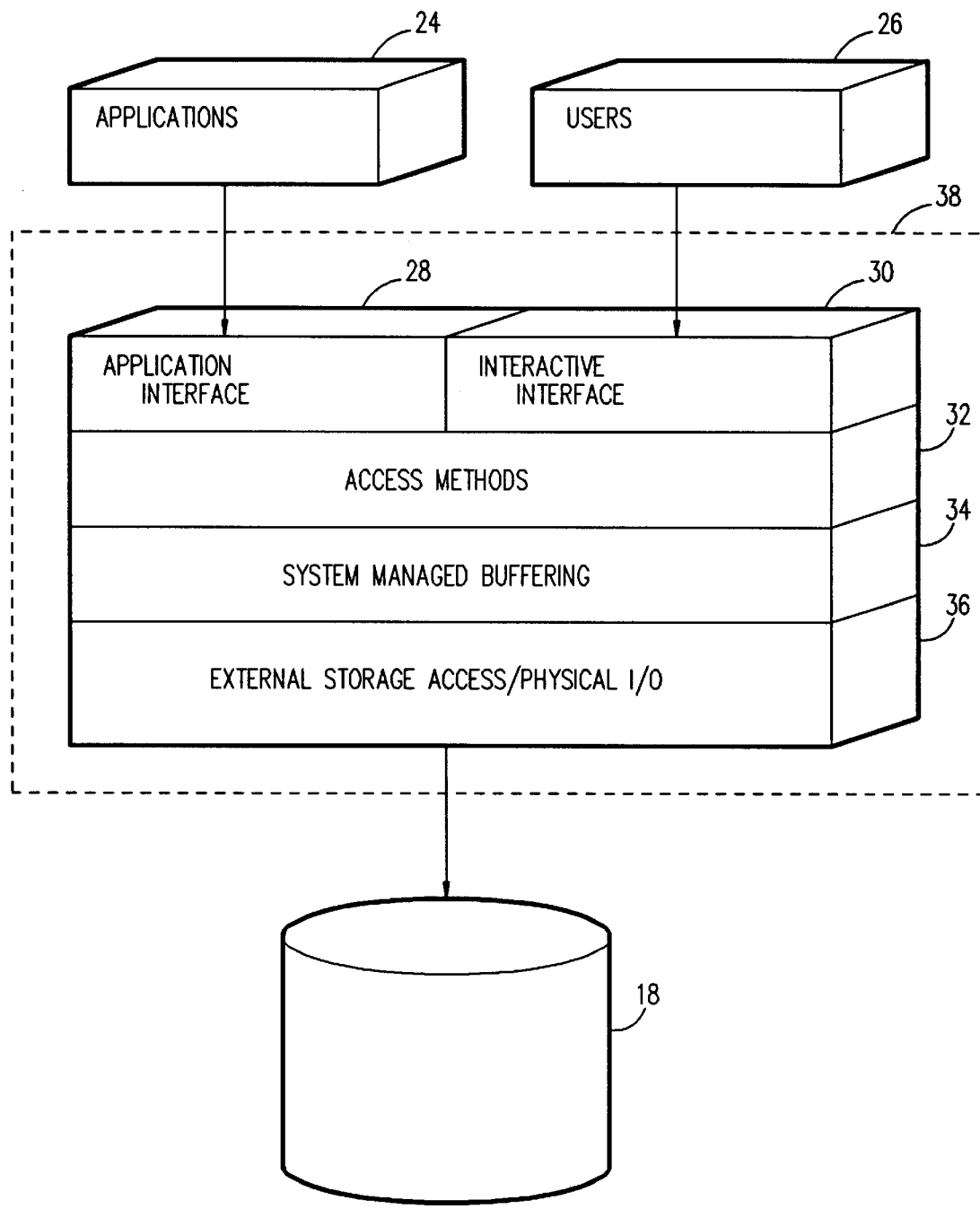
FIG. 2 is a schematic block diagram of a data storage system having automated buffer management as described in the present invention.

Referring to FIG. 2, a simplified block diagram shows the relationships of users/application programs 24, 26 to a data storage system 38 executing on a host processor and external devices such as DASD 18 in accordance with the present invention. A large number of application programs may operate within the host processor or may access the host processor from local area networks. The data storage system which provides the logical and physical connection between the applications and external storage devices is known in the art. One example of the data storage system 38 is the IBM Data Facility Storage Management Subsystem or DFSMS. The data storage system includes an application interface 28 such as JCL or an interactive interface 30 such as ISMF or ISPF which allows a user to interface with the operating system directly.

Access methods 32 are the portion of the software designed to access records on the external device. Access methods 32 such as VSAM, are responsible for the record and buffer management of the I/O request. System managed buffering 34 gets control when an application requests to open a dataset to access VSAM data that is not a locally or globally shared resource. System managed buffering calculates and allocates the appropriate buffers for the application and ultimately VSAM who then and passes control to the physical I/O manager to actually retrieve the data. The interface between the data storage system 38 and the external storage 18 takes place through the external storage access and physical I/O 36 portion of the data storage system.

Operational Flow

Figure 3:
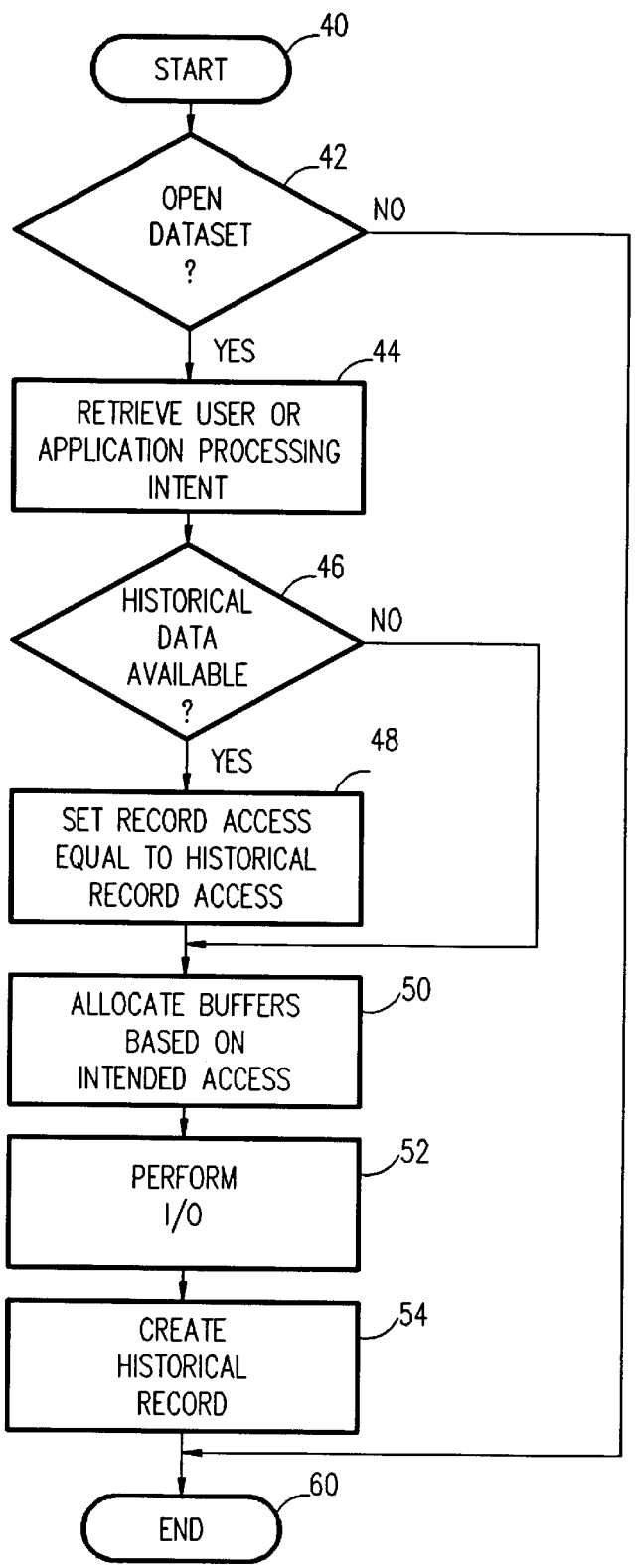
FIG. 3 is a flow diagram of the system and method of buffer allocation and management as set forth in the present invention.

Referring to FIG. 3, a flowchart shows the overall operation of the method of buffer allocation in the preferred embodiment of the present invention. As previously mentioned, system managed buffering 36 gets control when an application requests to open a dataset to access VSAM data that is not a locally or globally shared resource. A fundamental control block of a VSAM application is the ACB or Access Control Block. The main purpose of the ACB is to connect the program to the dataset the application wishes to process. Other functions of the ACB are to pass information on input or output processing, sequential or direct access, and definition of I/O areas. Starting at step 42, the access method for the system determines if for the open request the processing intent is for a non-shared VSAM resource. If yes, the system proceeds to step 44 where it extracts from the ACB control block the information regarding the request, including the VSAM file size, the file structure, and the intended access to the file records. Next, at step 46, the system checks a database to see if there is any performance data that matches the current processing intent. The database record contains information which includes the record access that was requested by the application as well as the record access that actually occurred. If the database files indicate a difference between the access requested and the access actually performed by this particular application, then the system automatically sets the record access of the current request equal the record access actually executed in the past 48. Next, at 50, the system allocates the buffers, index and data, based on the record access to the data. Each of these methods will be shown and described in connection with the flow diagrams in FIGS. 5 through 10.

Figure 4:
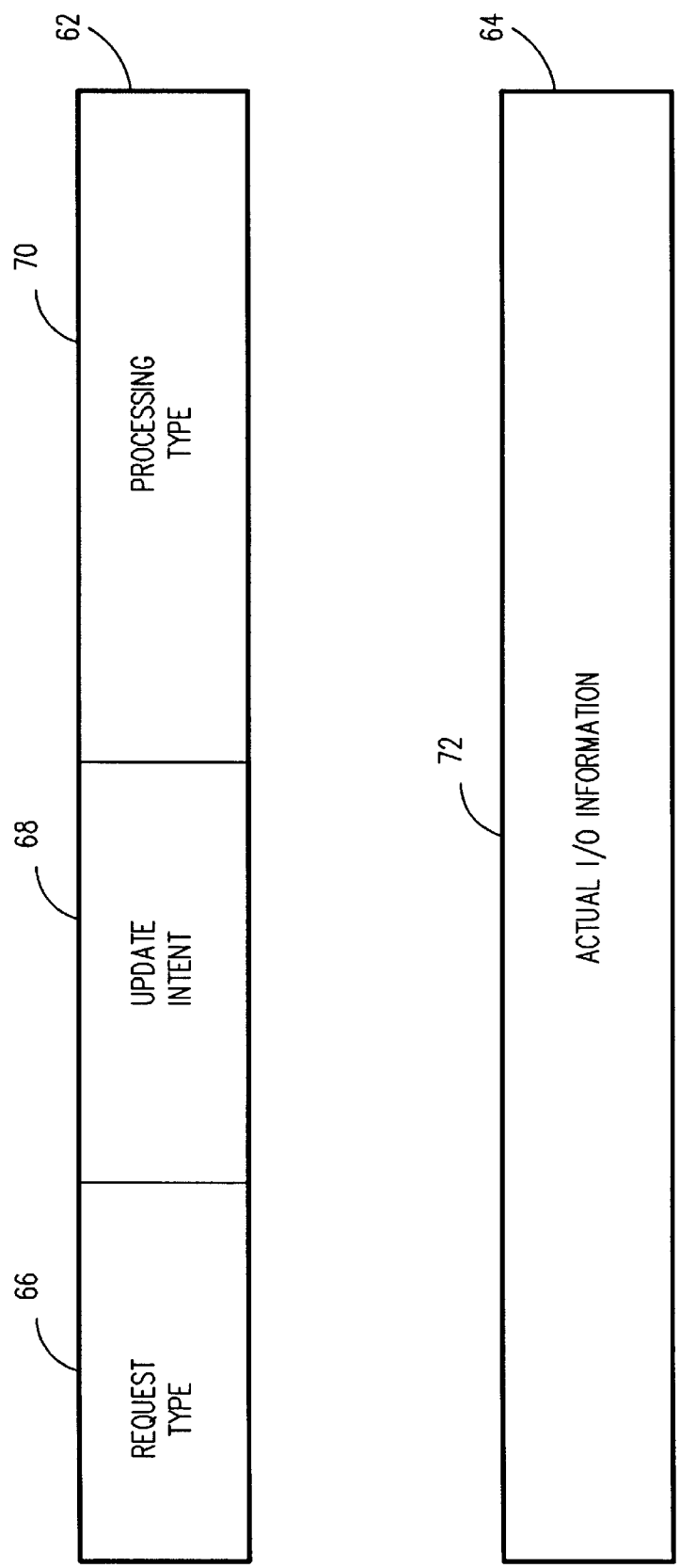
FIG. 4 illustrates a sample database record which records the performance of the I/O request for future analysis.

After the buffers are allocated at step 50, the system then performs the actual I/O 52. After the I/O request has been completed 52, the system records the event for subsequent analysis 54, and passes control back to the user or application, indicated at step 60. A sample of a database record that could be used in accordance with the present invention is shown in FIG. 4. A typical entry would include a header 62 and actual I/O information 64. The header 62 would include information such as the request type 66, the update intent 68, and the processing type 70. The actual I/O information 72 could be of different types. For example, in a positioning request (such as direct processing) the actual data would include information about the actual data that is being referenced such as the control interval number. For a non-positioning request (such as sequential processing), the actual information might include a count of successive requests of this type. For still other requests, such as a single put or write, there may be no additional information required.

Direct Optimized Processing

Figure 5A:
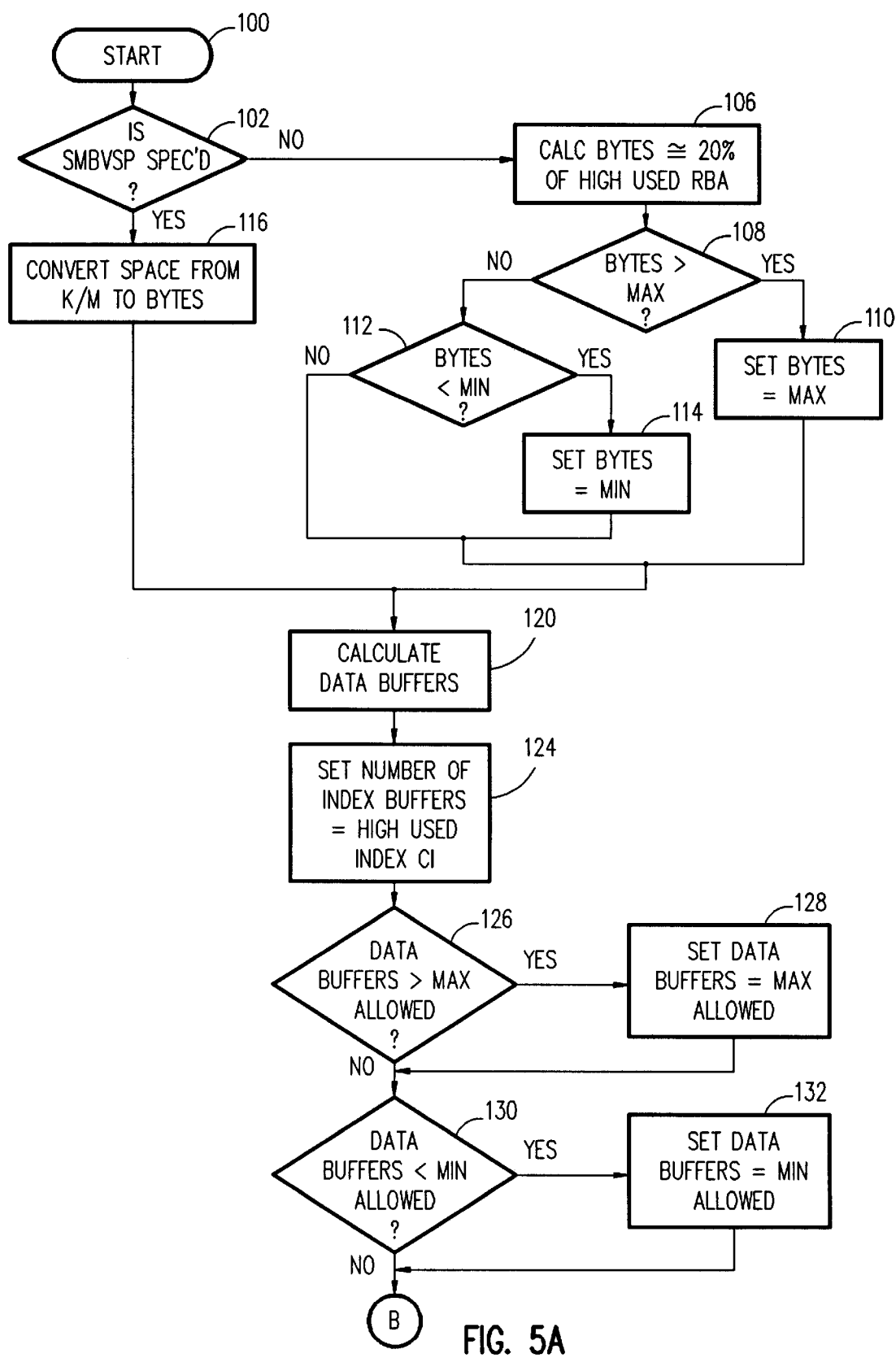
FIGS. 5A–5C illustrate the flow diagram of the direct optimized method of buffer allocation.
Figure 5B:
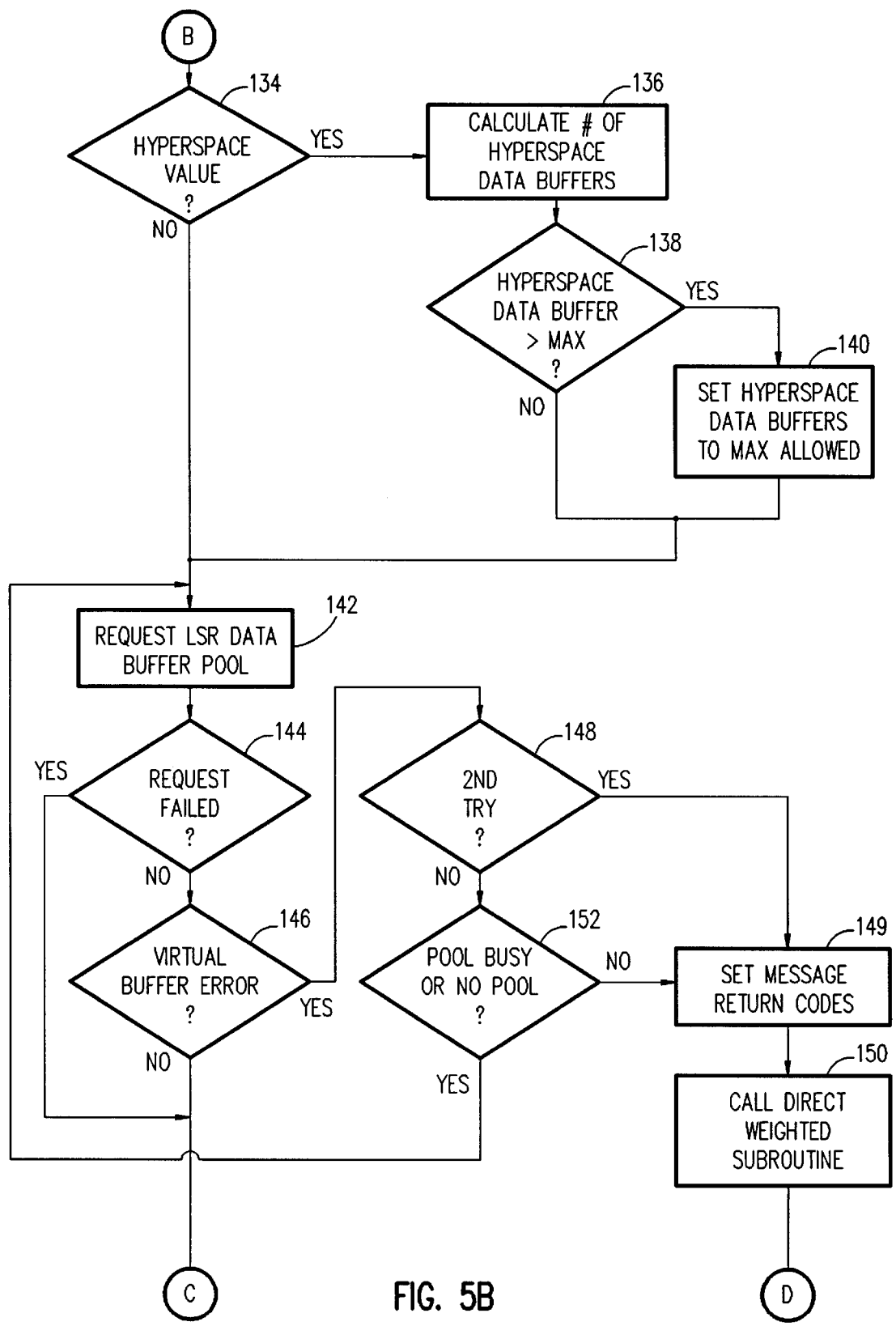
Figure 5C:
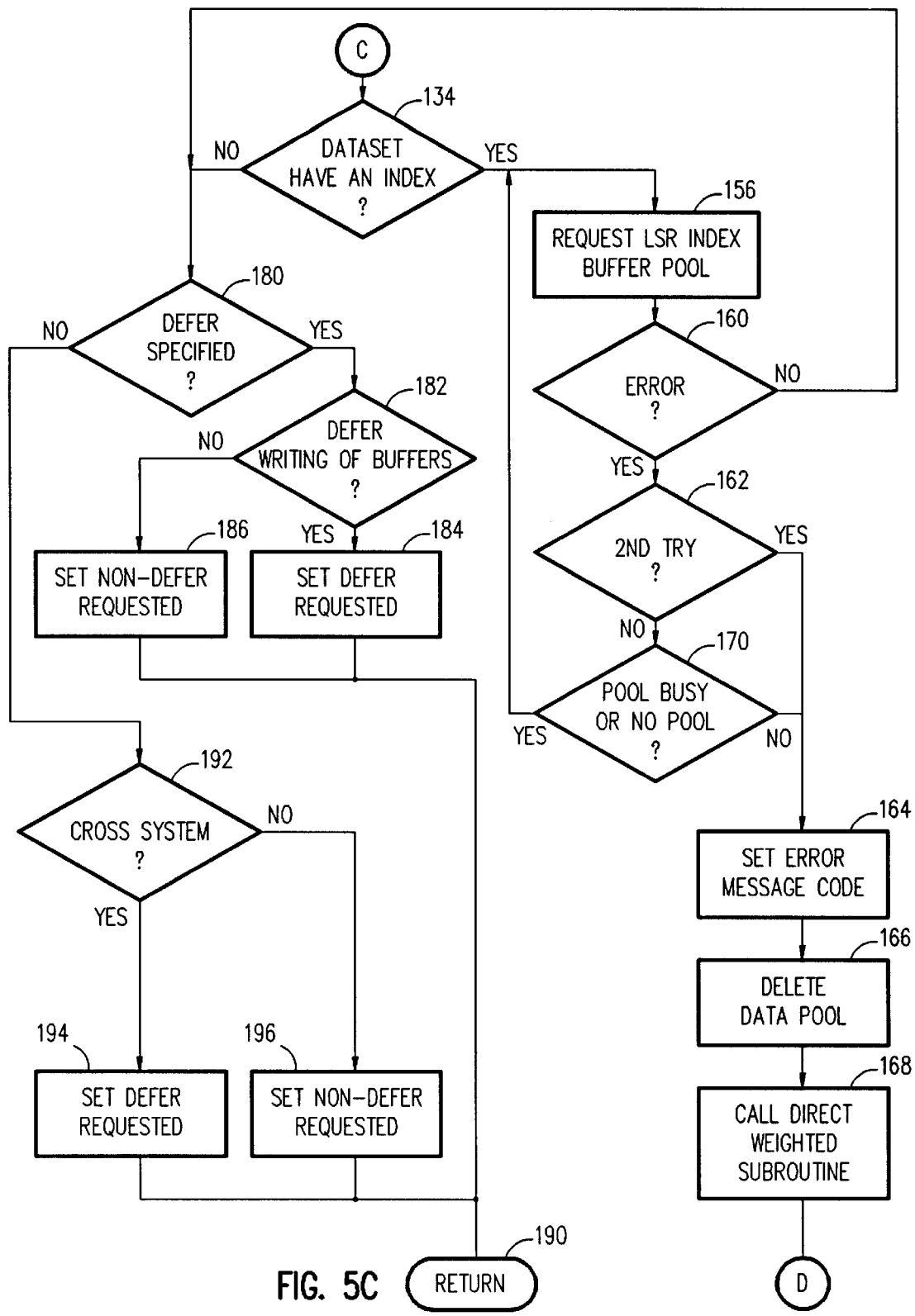
Figure 6A:
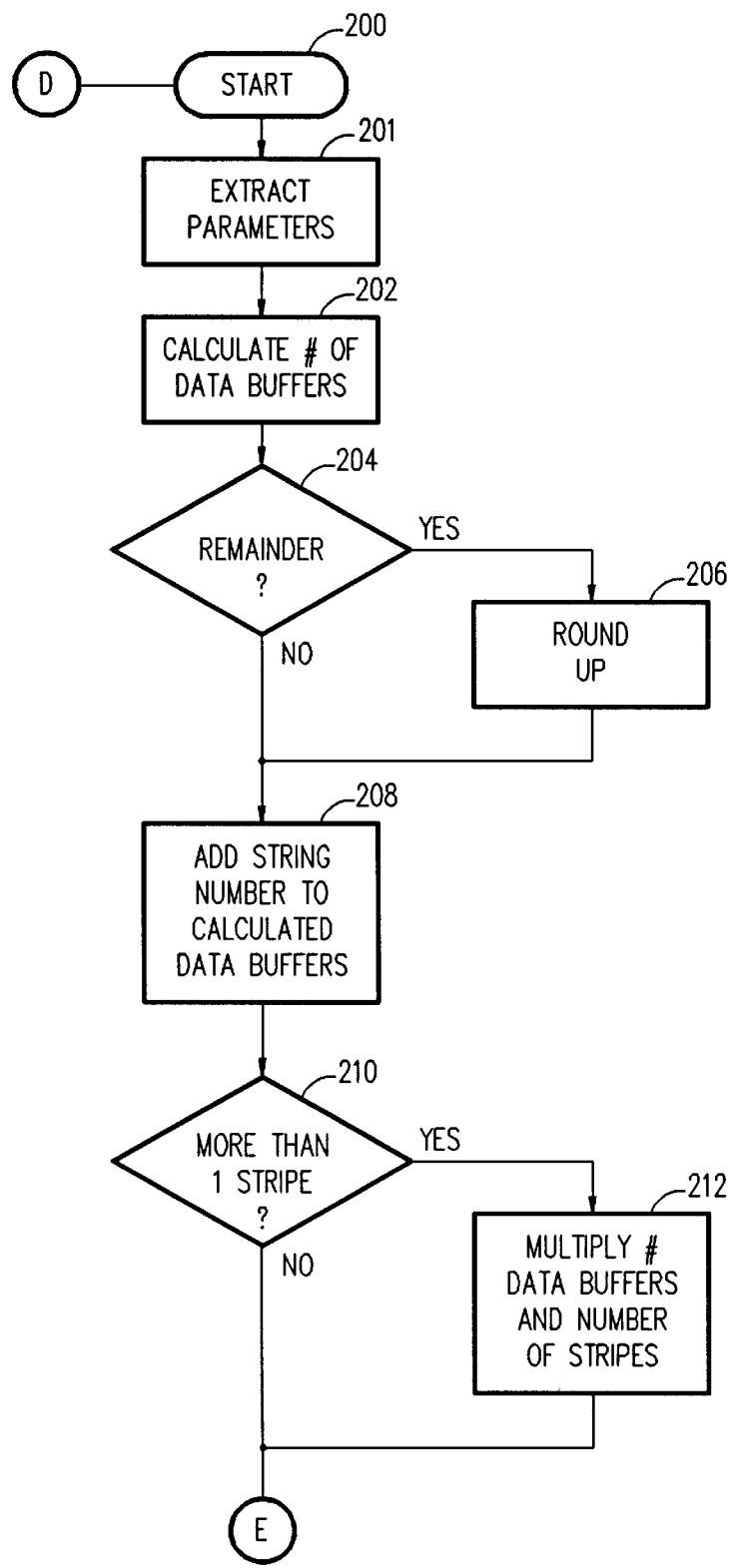
FIGS. 6A-6B illustrate the flow diagram of the direct weighted method of buffer allocation.
Figure 6B:
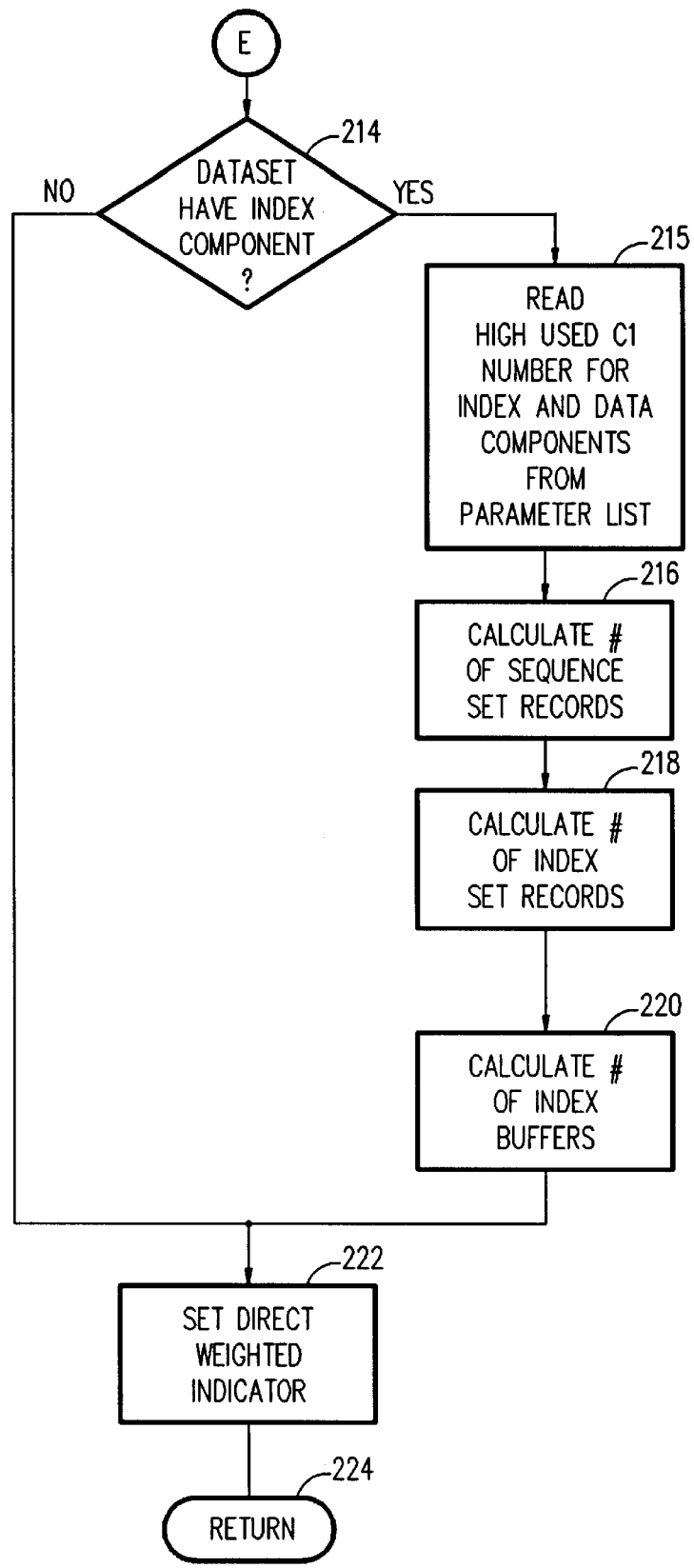

If, at step 50 in FIG. 3, the requested record access to the file is direct processing, then the subroutine shown in FIGS. 5A–5C would be invoked. FIGS. 5A–5C shows a direct optimized method of buffer allocation. In a direct optimized environment the record access to the file is in random order.

The subroutine function is called from step 50 of FIG. 3, and is entered at step 100. At step 102, the system checks to see if the amount of virtual storage space to be used for buffers in this application is specified. If it is specified, two elements are present, the amount and whether that amount is in kilobytes or megabytes ("K" or "M", respectively). The system then converts the virtual storage request into bytes by multiplying the amount given by kilobytes (1,024) or megabytes (1,048,576) to come up with the calculated bytes 116. If, at step 102, the amount of virtual storage is not specified, the system proceeds to step 106 and calculates the bytes by using the highest Relative Byte Address (RBA) of the file. The RBA is the offset in bytes of the beginning of the record farthest from the beginning of the file. The highest used RBA is available from information obtained from the dataset catalog entry record. The system then calculates twenty percent of the RBA and sets it equal to the calculated bytes 106. Twenty percent is used here as an optimum percentage. This amount can be increased or decreased and still be within the scope of the buffer allocation method. For example, this amount may be lowered to ten percent, or increased to thirty and have only a small impact on the performance of the I/O request. The calculated bytes is checked to see if it is greater than one hundred megabytes, a predefined maximum, 108. If the calculation is greater than one hundred megabytes, the system sets the calculated bytes equal to one hundred megabytes 110. When the calculation is less than one hundred megabytes, another check is performed to determine if the calculation is less than ten megabytes, a predefined minimum, 112. When the calculation is less than ten megabytes, then the system sets the calculated bytes equal to ten megabytes 114. No change is performed when the calculation is less than one hundred megabytes and greater than ten megabytes. Again, these predefined maximum and minimum are exemplary, and the values can change as the capacity the storage area increases or decreases.

Having calculated the size of the data in bytes that the application intends to perform I/O against, the system then can calculate the number of buffers. To calculate the buffers, the system uses the data Control Interval (CI) size and the index Control Interval (CI) size. Generally, a CI is the basic building block of a file, it contains an area for records and control information for those records to be stored. The CI size is specified when the file is originally defined and is not changed thereafter. There are two possible CIs depending on the type of file, data CIs and index CIs. Data CIs hold the data records for the file and index CIs hold related index information, like an address or pointer, for the data CIs.

With the passed parameter data and the calculated bytes, the system calculates the optimum number of data buffers as equal to the calculated bytes divided by the data CI size 120. Then the index buffers are set equal to the highest used index CI 124.

The system checks to see if the data buffers are greater than the maximum allowed for the system 126. If the data buffers are greater than the maximum allowed, then the system sets the data buffers equal to the maximum allowed 128. The next check is to see if the data buffers are less than the minimum allowed 130, the system sets them equal to the minimum allowed when they are less than the minimum 132.

Hiperspace, also referred to as expanded memory, is a processor feature. It is memory that falls between the virtual memory of the CPU and the DASD controller cache. Requests for data in hiperspace take longer for the system to retrieve than virtual memory but not as long as it takes the system to retrieve data from the controller cache or the disk. A specific parameter is set to request hiperspace data buffers. At this time the system checks to see if a hiperspace value is specified 134. If there is a value for hiperspace data buffers, it is a numeric value indicating a multiple of the number of virtual data buffers. When hiperspace data buffers are requested, the system sets the number of hiperspace data buffers equal to the hiperspace value multiplied by the number of virtual data buffers 136. There is a limit on the number of hiperspace data buffers that can be requested, so the system will then check to see if the hiperspace data buffers are greater than the maximum allowed 138. If the request is higher than the maximum, the hiperspace data buffers will be set equal to the maximum allowed 140.

The system now has all the information needed to request the virtual data buffers, virtual index buffers and hiperspace data buffers. At step 142 the system sends a request to get the virtual data buffers and hiperspace data buffers, if specified, from the Local Shared Resource (LSR) data buffer pool. If the request for hiperspace data buffers failed, the system continues and the hiperspace data buffers are not made available 144. The next system check is to see if errors occurred concerning the virtual data buffers 146. When there are no errors, the system continues on to step 154. However, if errors are encountered, a second attempt is made before falling out of the direct optimized algorithm. The system checks if this is the second attempt 148. On the first attempt the system will check to see if the error was because no pools were available or if the pool ID was busy 152, if those are the errors, then the system will attempt another request for the virtual data buffers and hiperspace data buffers at 142. Otherwise, the system discontinues the direct optimized algorithm. On the second try with errors the system also discontinues with the direct optimized subroutine. At step 149, the error message return codes are set to indicate the error and then at 150 the system calls the direct weighted subroutine.

Next the system requests the index buffers. The system checks to see if the data set has an index component 154. When there is no index component the system skips the steps requesting one. If there is an index component, a request is sent to obtain the desired index buffers from the LSR index buffer pool 156. The system handles errors very much the same as it did with the request for data buffers. The system checks for errors at step 160. If there are no errors, the system continues with the direct optimized subroutine 180. However, when there are errors the system will attempt to make a second try. At step 162 the system checks to see if this is the second attempt. If it is not the second attempt, the next check is if the error is one that can be overcome, either that the pool ID was busy or there were no pools available 170. When the error is recognized as one of the two designated errors, the system requests the index buffers again at 156. When the errors are not the two designated errors, the system exits the direct optimized subroutine and goes to the direct weighted subroutine. The system also exits the direct optimized subroutine and goes to the direct weighted subroutine when there was a second attempt with errors. Before the system goes to the direct weighted subroutine, it sets error message codes 164, deletes the data pool 166 and then calls the direct weighted subroutine 168.

The last step for direct optimized will be to check if a parameter is set which indicates that the system should defer writing buffers to the disk until the buffer is required for a different request or until the data set is closed 180. The default depends on the system and it can be either to defer writing buffers or to immediately write buffers to the disk. Whichever is specified takes precedence over the default for the system. There are two variables used when a request is made to defer the writing of data buffers, the first is a single bit that indicates the user specified what was to be done and the second is whether the user indicated Yes or No for deferring the writing of the buffers. At step 180 the system checks to see if a request to defer writing is indicated. If a request is specified, the next step is to check if the request was to defer writing of the buffers 182. When Yes is indicated, the system sets parameters such that defer writing of the buffers is requested 184. If a request is specified and the request is No, to not defer writing of the buffers, then the system sets parameters such that defer writing of the buffers is not requested 186. When deferring the buffers is not specified at all, the system determines what is to be done based on set parameters 192. When cross region share option one or two are defined and cross system share option four is not defined, the system sets the parameters to defer writing of the buffers 194. Anything else causes the system to set the parameters to not defer writing of the buffers 196. The direct optimized algorithm is completed and the system returns 190.

Direct Weighted Processing

In a direct weighted environment the record access to the file is primarily direct processing however there is some sequential processing. If, at step 50 in FIG. 3, the record access to the file was to be mostly direct processing with some sequential processing, (or as indicated in the direct optimized processing steps 150, 168) then the subroutine shown in FIGS. 6A-6B would be invoked. This method shown in FIGS. 6A-6B will provide a nominal number of read ahead buffers for sequential retrieval and a maximum number of index buffers for direct requests. By using read ahead, sequential processing is expedited by already having the data read into a buffer when the processing program is ready to access it. The subroutine function is entered at step 200. At step 202, the system calculates the number of data buffers by using elements from the parameter list which is made available to the system (extracted at step 201). The number of data buffers is set equal to the data CI size divided by the data component physical block size and that result is divided into the number of blocks per track for the data component. This equation takes into account some of the device specific features which are relevant to an I/O request like number of blocks per track and physical block size. At step 204 the system determines if there is a remainder. When there is a remainder, the system rounds up the result by adding one to the data buffers 206. The resulting value is rounded to a track boundary which is only required when data CI size is not equal to physical block size. When there is no remainder, the system need not make any adjustment. The number of data buffers is approximately the number of CIs per track as this is a reasonable number of buffers for read ahead when it is determined that the processing will be primarily random and some sequential.

Several other adjustments to the data buffers are performed due to specific functions that affect the efficiency of the data buffers. At step 208 the system adds to the data buffers the number of strings. The number of strings indicates the number of requests that the processing program can have active concurrently. When the system allows a large number of active requests at one time, the buffers needs to be increased to better handle the multiple requests. The system also checks to determine if the number of stripes indicated in the parameter list is greater than one 210. Striping is a method whereby sequential data is sent to/from one or more storage devices in parallel. The number of stripes indicates the number of volumes of storage to which the data set is written. Striping is performed to save on I/O response time. If the data is striped across several volumes of storage the I/O requests are spread out over several volumes and can overlap causing reduced response time. To optimize performance, the data buffers need to be increased to facilitate striping. At step 212 the system sets the data buffers equal to the number of stripes multiplied by the previously defined number of data buffers.

Next the system defines the optimum number for the index buffers. The number of index buffers is chosen to be able to already have the index set CIs in storage and thus avoid I/O requests to the index set for direct processing, leaving only sequence set I/O. Initially, the system determines if an index component is specified 214. When there is no index component the system is finished with calculations for the direct weighted algorithm and sets the direct weighted indicator 222 and returns 224. If an index component is present, the system first calculates the number of index sequence set records. The system sets the number of index sequence set records equal to the highest used data CIs divided by the data CIs per CAs 216, the system pulls these from the parameter list. With that calculation, the system calculates the number of index set records which is set equal to the number of highest used index CIs minus the number of sequence set records 218. Finally, the system calculates the optimum number of index buffers by setting index buffers equal to the number of index set records plus the number of strings 220.

The system now has optimum values for the data and index buffers for a direct weighted environment and these values are in the output section of the parameter list. These values are used later when the system makes the request for the buffers. The system sets the algorithm indicator to direct weighted (DW) 222 and returns 224.

Sequential Optimized Processing

Figure 7:
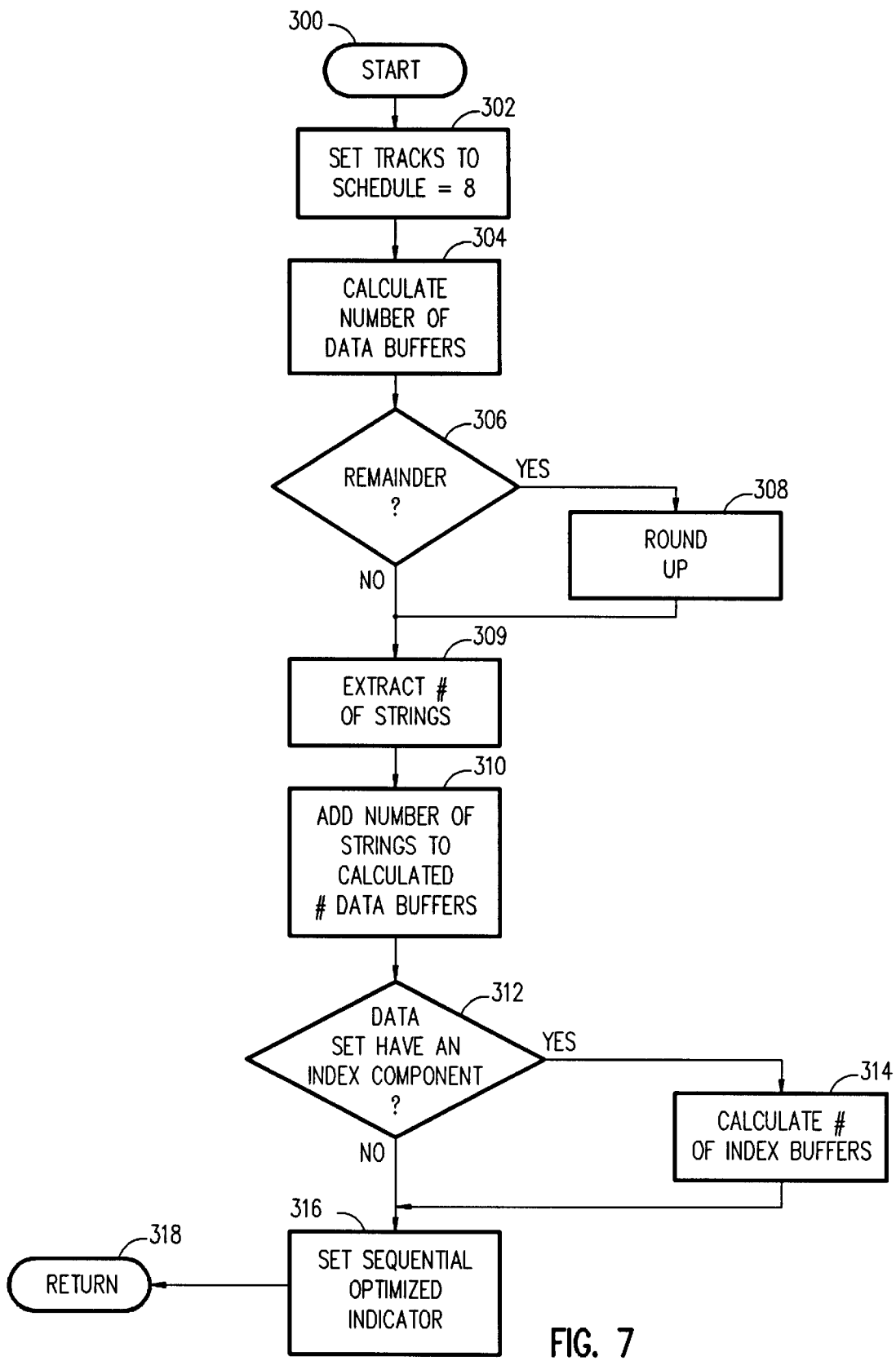
FIG. 7 illustrates the flow diagram of the sequential optimized method of buffer allocation.

If, at step 50 in FIG. 3, the record access to the file was to be strictly sequential processing, then the subroutine shown in FIG. 7 would be invoked. In a sequential optimized environment the record access to the file is strictly in sequential order. This method allows for maximum read ahead processing for sequential retrieval. The method by which the system calculates the number of buffers is shown and described in FIG. 7. The subroutine function is entered at step 300. At step 302, the system sets tracks to schedule equal to eight. This value is used in later calculations. The system calculates the number of data buffers by first calculating the data CI size divided by the data physical block size, taking that value and dividing it into number of data blocks per track and then multiplying that value by tracks to schedule 304. All of the parameters used in the previous equation are from the parameter listing passed to the algorithm except tracks to schedule which was defined earlier. These parameters define data set and device characteristics and these characteristics influence buffer allocation and hereby I/O performance. At step 306, the system determines if there is a remainder. When there is a remainder, the system rounds up the result by adding one to the data buffers 308. The resulting value is rounded to a track boundary which is only required when data CI size is not equal to physical block size. When there is no remainder, the system need not make any adjustment. At step 309 the system extracts the number of strings from the parameter list and at step 310 the system adds to the data buffers the number of strings. The number of strings indicates the number of requests that the processing program can have active concurrently. When the system allows a large number of active requests at one time, the number of buffers needs to be increased to better handle the multiple requests.

Next the system checks to see if an index component is specified for the data set 312. When there is no index component the system is finished with all calculations and continues to step 316 to set the sequential optimized indicator and returns at 318. If an index component is present, the system calculates the number of index buffers 314 by setting the index buffers equal to the number of index levels minus one plus the number of strings. All of the elements of the equation are pulled from the parameter list. This allows for enough buffers for a single path through the index structure as well as for the index sequence set.

The system now has optimum values for the data and index buffers for a sequential optimized environment and these values are in the output section of the parameter list. These values are used later when the system makes the request for the buffers. The system sets the algorithm indicator to sequential optimized (SO) 316 and returns 318.

Sequential Weighted Processing

Figure 8:
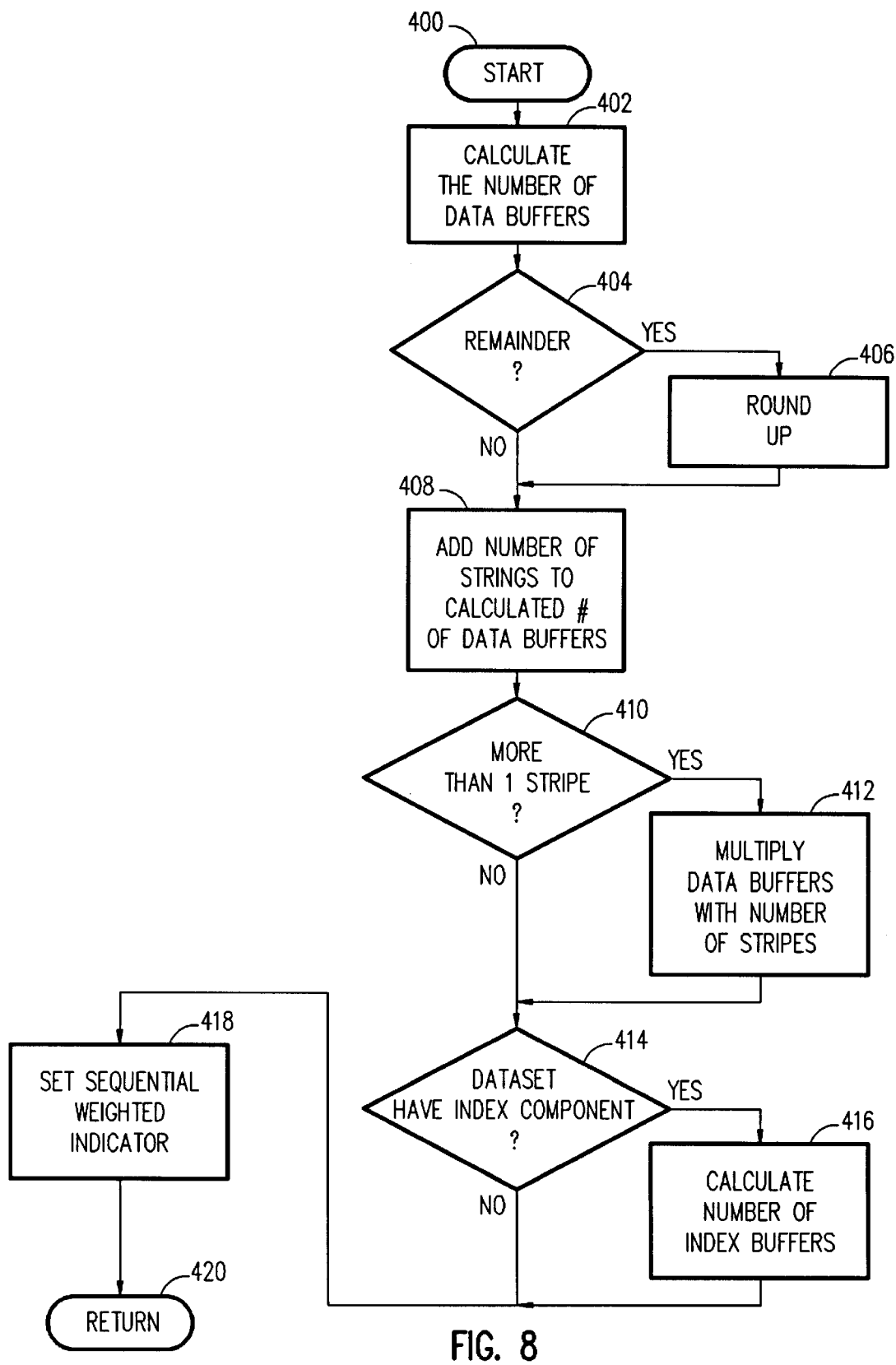
FIG. 8 illustrates the flow diagram of the sequential weighted method of buffer allocation.

If, at step 50 in FIG. 3, the record access to the file was to be a majority of sequential processing but some direct processing, then the subroutine shown in FIG. 8 would be invoked. In a sequential weighted environment the record access to the file is primarily sequential processing however there is some direct processing. This method will use read ahead buffers for sequential processing and provide additional index buffers for the direct requests. The read ahead will not be the large amount of data transferred as with the sequential optimized method. The method by which the system calculates the number of buffers is shown and described in the flow diagram of FIG. 8. The subroutine function is entered at step 400. At step 402, the system calculates the number of data buffers by using elements from the parameter list which is made available to the system. The number of data buffers is set equal to the data CI size divided by the data component physical block size, that result is divided into the number of blocks per track for the data component and that result is multiplied by two. This equation takes into account some of the device specific features which are relevant to an I/O request like number of blocks per track and physical block size. At step 404, the system determines if there is a remainder. When there is a remainder, the system rounds up the result by adding one to the data buffers 406. The resulting value is rounded to a track boundary which is only required when data CI size is not equal to physical block size. When there is no remainder, the system need not make any adjustment.

Several other adjustments to the data buffers are performed due to specific functions that affect the efficiency of the data buffers. At step 408 the system adds to the data buffers the number of strings. The number of strings indicates the number of requests that the processing program can have active concurrently. When the system allows a large number of active requests at one time, the buffer size needs to be increased to better handle the multiple requests. The system then checks to determine if the number of stripes indicated in the parameter list is greater than one 410. The number of stripes indicates the number of volumes of storage to which the data set is written. Striping is performed to save on I/O response time. If the data is striped across several volumes of storage the I/O requests are spread out over several volumes and can overlap causing reduced response time. To optimize performance, the data buffers need to be increased to facilitate striping. At step 412 the system sets the number of data buffers equal to the number of stripes multiplied by the previously calculated number of data buffers.

Next the system defines the optimum number of index buffers. Initially, the system determines if an index component is specified 414. When there is no index component the system is finished with calculations for the sequential weighted algorithm and sets the sequential weighted indicator 418 and returns 420. If an index component is present, the system sets the index buffers equal to the number of index levels minus one plus the number of strings, the system pulls these from the parameter list.

The system now has optimum values for the data and index buffers for a sequential weighted environment and these values are in the output section of the parameter list. These values are used later when the system makes the request for the buffers. The system sets the algorithm indicator to sequential weighted (SW) 418 and returns 420.

Create Recovery Processina

Figure 9:
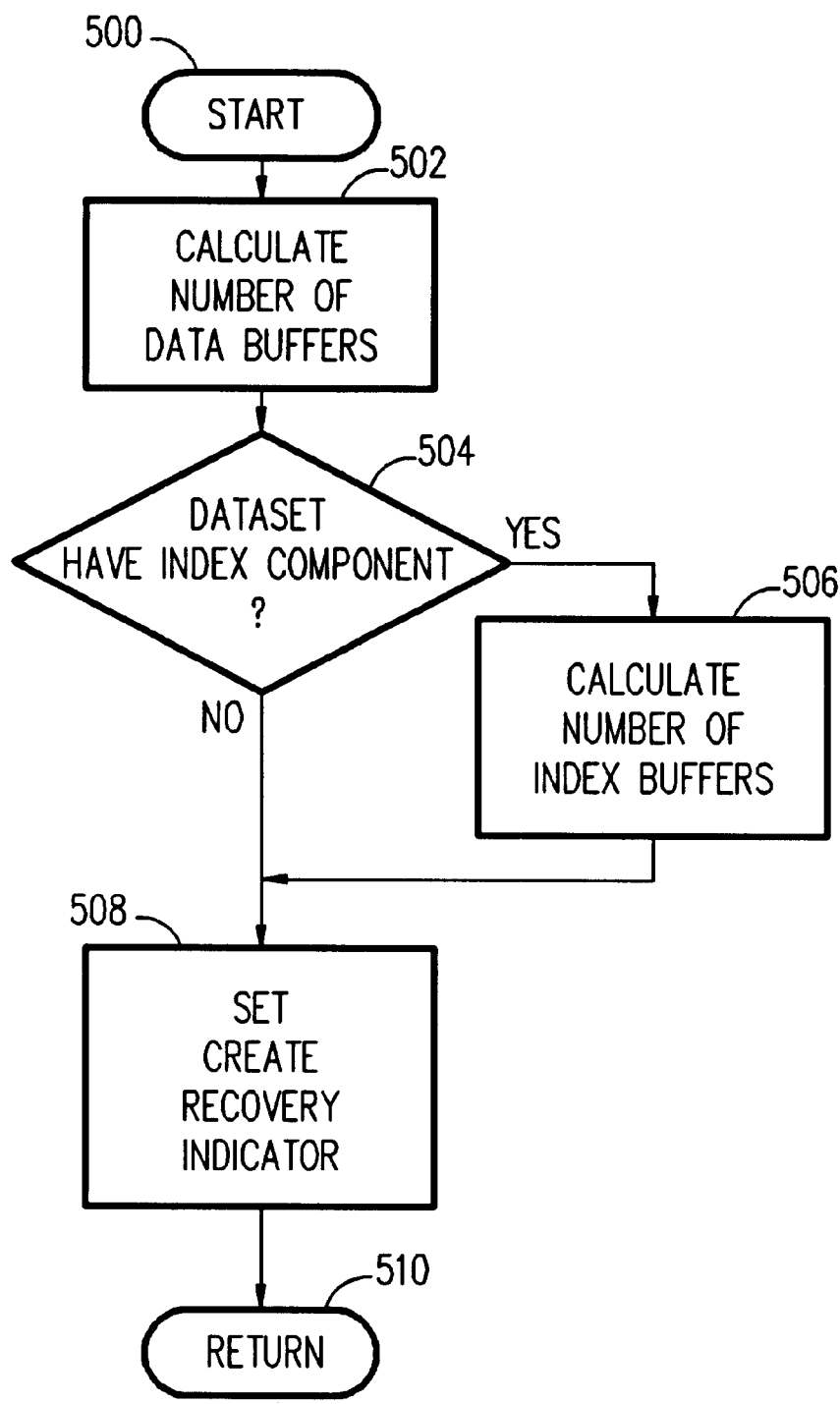
FIG. 9 illustrates the flow diagram of the create recovery method of buffer allocation.

If, at step 50 in FIG. 3, the file was to be created and recovery services are specified, then the subroutine shown in FIG. 9 would be invoked.

In a create recovery environment maximum buffers are used to optimize the load performance and recovery services are specified. The method by which the system calculates the number of buffers is shown and described in FIG. 9. The subroutine function is entered at step 500. At step 502, the system calculates the number of data buffers and sets them equal to the data CIs per CA plus one. The CIs per CA is a parameter from the parameter list. This provides for processing and I/O overlap with one-half of a CA. Next the system checks to see if an index component is specified for the data set 504. When there is no index component the system is finished with all calculations and continues to step 508 to set the create recovery indicator 508 and return 510. If an index component is present, at step 506 the system calculates the number of index buffers by setting the index buffers equal to six. This allows buffers for five levels of index CIs plus an extra for the index sequence set, thereby holding a large path of CIs at one time.

The system now has optimum values for the data and index buffers for a create recovery environment and these values are in the output section of the parameter list. These values are used later when the system makes the request for the buffers. The system sets the algorithm indicator to create recovery (CR) 508 and returns 510.

Create Optimized Processing

Figure 10:
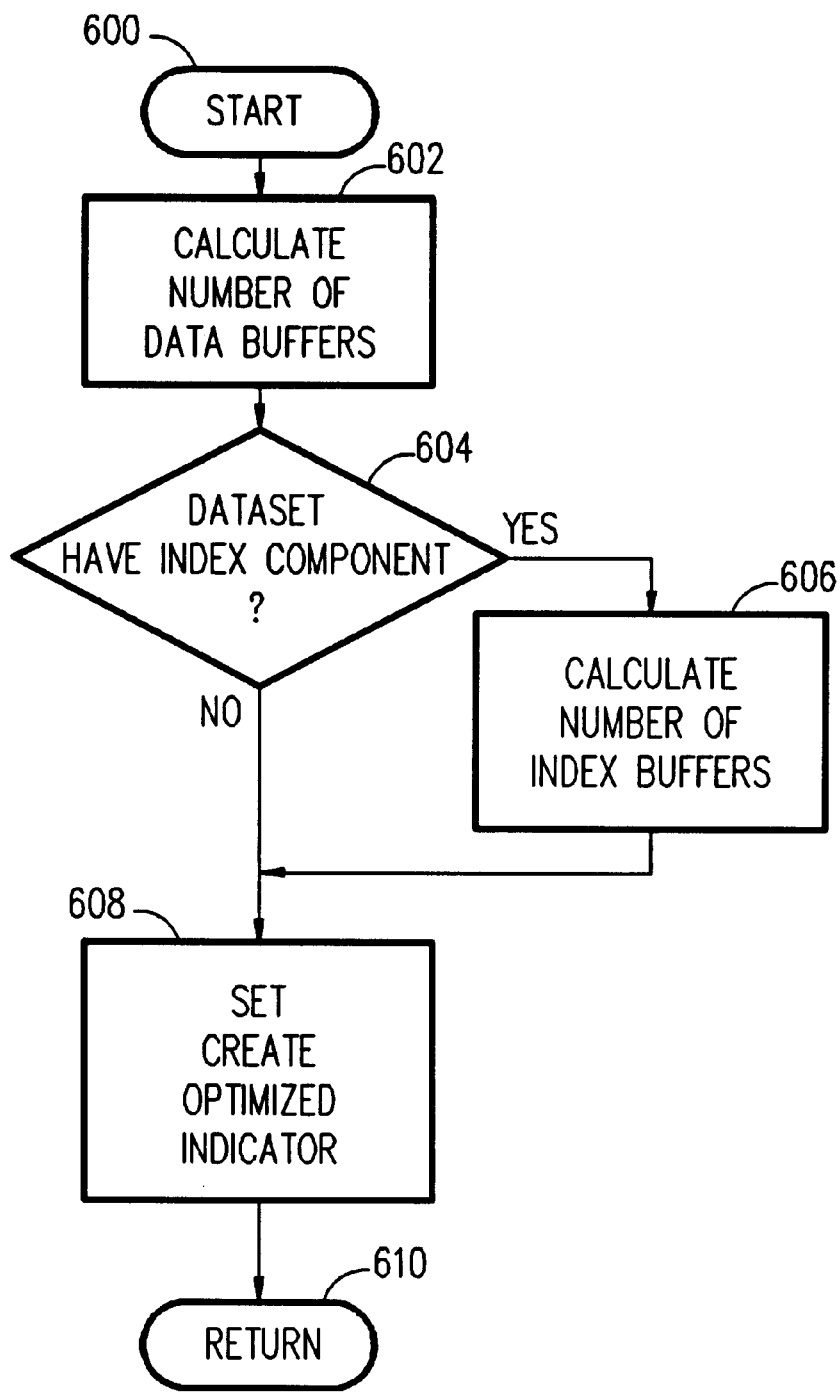
FIG. 10 illustrates the flow diagram of the create optimized method of buffer allocation.

If, at step 50 in FIG. 3, a file is to be created with an optimized load performance and recovery services are not specified, then the subroutine shown in FIG. 10 would be invoked. In a create optimized environment maximum buffers are used to optimize the load performance. The method by which the system calculates the number of buffers is shown and described in FIG. 10. The subroutine function is entered at step 600. At step 602, the system calculates the number of data buffers and sets them equal to two multiplied by the data CIs per CA. The CIs per CA is a parameter from the parameter list. This provides for processing and I/O overlap with a whole CA at a time. Next the system checks to see if an index component is specified for the data set 604. When there is no index component the system is finished with all calculations and continues to step 608 to set the create optimized indicator and returns at step 610. If an index component is present, at step 606 the system calculates the index buffers by setting the index buffers equal to the index CIs per CA multiplied by two.

The system now has optimum values for the data and index buffers for a create optimized environment and these values are in the output section of the parameter list. These values are used later when the system makes the request for the buffers. The system sets the algorithm indicator to create optimized (CO) 608 and returns 610.

CONCLUSION

The invention has been described by way of a preferred embodiment, but those skilled in the art will understand that various changes in form and detail may be made without deviating from the spirit or scope of the invention.

What is claimed is:

1. A method for dynamically allocating buffers in a storage system having a processor, memory, and at least one storage device having data stored thereon, the method comprising the processor-executed steps of:

receiving a request to input data from or output data to said storage device;

reading a variable in a control block relating to a stated application processing intent to determine the record access to said data on said data storage device;

detecting the intended record access to said data on said storage device;

determining the buffer management technique to use for accessing the stored data;

calculating the number of buffers to be allocated based on the intended record access to said data;

allocating the number of buffers in a buffer area;

checking a database for an entry that matches the received application and specified processing intent, said entry including the requested access to said data and said actual access to said data; and resetting the record access to the data on the received specified processing intent to match the actual access to said data recorded in said database entry, if said entry was found.

2. The method for dynamically allocating buffers in a storage system as called for in claim 1, further comprising the steps of:

performing the input or the output request; and recording the event for later update of the database entry.

3. The method of dynamically allocating buffers in a storage system as called for in claim 2, wherein the database entry includes a header and actual input or output performance information.

4. The method of dynamically allocating buffers in a storage system as called for in claim 3, wherein the header further includes the request type, update intent and processing type.

5. The method for dynamically allocating buffers in a storage system as called for in claim 1, wherein said detecting step detects a record access that is random processing, further comprising the steps of:

determining the size of the file of said data to be input from or output to said storage device;

allocating a number of buffers equal to approximately twenty percent of said size of the file;

determining the number of index records to the data; and allocating a number of buffers equal to the number of index records to the data.

6. The method for dynamically allocating buffers in a storage system as called for in claim 1, wherein said detecting step detects a record access that is a majority of direct processing with some sequential processing, further comprising the steps of:

determining the number of data control intervals that reside on a track for which input or output to said device is to be performed;

allocating data buffers equal to approximately the number of control intervals per tracks;

determining the number of index records to the data;

allocating a maximum number of index buffers based on the computed number of index control intervals; and allocating a small number of read ahead buffers for buffering data.

7. The method for dynamically allocating buffers in a storage system as called for in claim 6, wherein said small number of read ahead buffers in a storage system is approximately one half the number of data control intervals per track.

8. The method for dynamically allocating buffers as set forth in claim 1, wherein said detecting step detects record access that is in sequential order, further comprising the steps of:

determining the number of data control intervals that reside on a cylinder for which input or output to said device is to be performed;

allocating data buffers equal to approximately one-half the number of control intervals per cylinder;

determining the number of index levels to the data;

allocating index buffers approximately equal to the number if index levels; and allocating a large number of read ahead buffers for buffering data.

9. The method of dynamically allocating buffers in a storage system as called for in claim 8, wherein said large number of read ahead buffers is approximately equal to one-fourth the number of data control intervals per cylinder.

10. The method for dynamically allocating buffers in a storage system as called for in claim 1, wherein said detecting step detects a record that is a majority of sequential processing with some direct processing, further comprising the steps of:

determining the number of data control intervals that reside on a track for which input or output to said device is to be performed;

allocating data buffers equal to approximately two times the number of control intervals per track;

determining the number of index records to the data;

allocating a maximum number of index buffers based on a computed number of index control intervals; and allocating a sufficient number of read ahead buffers for buffering data.

11. The method of dynamically allocating buffers in a storage system as claimed in claim 10, wherein said sufficient number of read head buffers is approximately equal the number of data control intervals per track.

12. The method for dynamically allocating buffers in a storage system as called for in claim 1, further comprising the step of:

reading a storage processing characteristic to determine the record access to said data on said data storage device.

13. The method for dynamically allocating buffers in a storage system as called for in claim 1, wherein said calculating step is further comprised of calculating the number of data buffers needed to perform the input or output request.

14. The method for dynamically allocating buffers in a storage system as called for in claim 1, wherein said calculating step is further comprised of calculating the number of index buffers needed to perform the input or output request.

15. The method for dynamically allocating buffers in a storage system as called for in claim 1, wherein said calculating step is further comprised of calculating the number of data buffers and index buffers needed to perform the input or output request.

16. A computerized storage system for managing the allocation of buffers during a dataset open request comprising:

at least one storage device having data stored thereon;

receiving means for receiving a request to input data to or read data from the storage device;

an intended access indicator for indicating the intended record access to the data on the storage device;

means for calculating an amount of buffers to be allocated based on the value of the intended access indicator;

reading means for reading data to the storage device and writing means for writing data to the storage device; and memory for storing request processing information about the performance of the reading means or the writing means.

17. The computerized storage system for managing the allocation of buffers during a dataset open request as set forth in claim 16, further comprising means for comparing request processing information in memory with the intended access indicator.

18. The computerized storage system for managing the allocation of buffers during a dataset open request as set forth in claim 16, wherein the buffers comprises data buffers and index buffers.

19. The computerized storage system for managing the allocation of buffers during a dataset open request as set forth in claim 18, further comprising means for allocating the data buffers and index buffers.

20. An article of manufacture for use in storing and managing data in a computer system, the computer system having a processor, memory, and at least one storage device having data stored thereon, said article of manufacture having a computer program code embodied in said medium which may cause the computer to:

receive a request to input data from or output data to said storage device;

determine the intended record access to said data on said storage device;

determine the buffer management technique to use for accessing the stored data;

calculate the number of buffers to be allocated based on the intended record access to said data;

allocate the number of buffers in a buffer area;

read a variable in a control block relating to a stated application processing intent to determine the record access to said data on said data storage device;

check a database for an entry that matches the received input or output request, said entry including the requested access to said data and said actual access to said data; and reset the intended record access to the data on the received input or output request to match the actual access to said data recorded in said database entry, if said entry was found.

21. The article of manufacture as claimed in claim 20, wherein the program code may further cause the computer to:

perform the input or the output request; and record the event for later update of the database entry.

22. The article of manufacture as claimed in claim 21, wherein the database entry includes a header and actual input or output performance information.

23. The article of manufacture as claimed in claim 22, wherein the header further includes the request type, update intent and processing type.

24. The article of manufacture as claimed in claim 20, wherein the program code may detect a record access that is random processing, may further cause the computer to:

determine the size of the file of said data to be input from or output to said storage device;

allocate a number of buffers equal to approximately twenty percent of said size of the file;

determine the number of index records to the data; and allocate a number of buffers equal to the number of index records to the data.

25. The article of manufacture as claimed in claim 20, wherein the program code may detect a record access that is a majority of direct processing with some sequential processing, and may further cause the computer to:

determine the number of data control intervals that reside on a track for which input or output to said device is to be performed;

allocate data buffers equal to approximately the number of control intervals per tracks;

determine the number of index records to the data;

allocate a maximum number of index buffers based on the computed number of index control intervals; and allocate a small number of read ahead buffers for buffering data.

26. The article of manufacture as claimed in claim 25, wherein said small number of read ahead buffers in a storage system is approximately one half the number of data control intervals per track.

27. The article of manufacture as claimed in claim 20, wherein the program code may detect a record access that is in sequential order, and may further cause the computer to:

determine the number of data control intervals that reside on a cylinder for which input or output to said device is to be performed;

allocate data buffers equal to approximately one-half the number of control intervals per cylinder;

determine the number of index levels to the data;

allocate index buffers approximately equal to the number if index levels; and allocate a large number of read ahead buffers for buffering data.

28. The article of manufacture as claimed in claim 27, wherein said large number of read ahead buffers is approximately equal to one-fourth the number of data control intervals per cylinder.

29. The article of manufacture as claimed in claim 20, wherein the program code detects a record that is a majority of sequential processing with some direct processing, and may further cause the computer to:

determine the number of data control intervals that reside on a track for which input or output to said device is to be performed;

allocate data buffers equal to approximately two times the number of control intervals per track;

determine the number of index records to the data;

allocate a maximum number of index buffers based on a computed number of index control intervals; and allocate a sufficient number of read ahead buffers for buffering data.

30. The article of manufacture as claimed in claim 29, wherein said sufficient number of read head buffers is approximately equal the number of data controa intervals per track.

31. The article of manufacture as claimed in claim 20, wherein the program code may further cause the computer to:

read a storage characteristic to determine the record access to said data on said data storage device.

32. The article of manufacture as claimed in claim 20, wherein the program code may further cause the computer to calculate the number of data buffers needed to perform the input or output request.

33. The article of manufacture as claimed in claim 20, wherein the program code may further cause the computer to calculate the number of index buffers needed to perform the input or output request.

34. The article of manufacture as claimed in claim 20, wherein the program code may further cause the computer to calculate the number of data buffers and index buffers needed to perform the input or output request.

* * * * *